(12) United States Patent
Osborn et al.

(10) Patent No.: US 11,004,085 B2
(45) Date of Patent: *May 11, 2021

(54) SYSTEMS AND METHODS FOR VISUAL VERIFICATION

(71) Applicant: Capital One Services, LLC, McLean, VA (US)

(72) Inventors: Kevin Osborn, Newton Highlands, MA (US); Daniel Marsch, McLean, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/674,511

(22) Filed: Nov. 5, 2019

(65) Prior Publication Data
US 2020/0167781 A1    May 28, 2020

Related U.S. Application Data

(63) Continuation of application No. 16/199,302, filed on Nov. 26, 2018, now Pat. No. 10,475,038.

(51) Int. Cl.
*G06K 9/00*   (2006.01)
*G06Q 20/40*  (2012.01)
(Continued)

(52) U.S. Cl.
CPC ......... *G06Q 20/409* (2013.01); *G02B 27/288* (2013.01); *G02B 30/27* (2020.01);
(Continued)

(58) Field of Classification Search
CPC .............. G06Q 20/409; G02B 27/2214; G02B 27/288; G06K 9/00449; G06K 9/00456;
(Continued)

(56) References Cited

U.S. PATENT DOCUMENTS 4,692,019 A     9/1987   Morimoto et al.
4,711,566 A  *  12/1987  Evans .................... G03B 27/80
                                                           355/41

(Continued)

*Primary Examiner* — Amir Alavi
(74) *Attorney, Agent, or Firm* — Troutman Pepper Hamilton Sanders LLP; Christopher J. Forstner

(57) ABSTRACT

A system comprising: a document holder; an image sensor directed toward the document holder; a polarized filter between the image sensor and the document holder; a filter motor configured to rotate the polarized filter; one or more processors; and at least one memory having stored thereon computer program code that, when executed by the one or more processors, instructs the one or more processors to: control the filter motor to rotate the polarized filter; control the image sensors to capture a plurality of images of a document within the document holder, the plurality of images corresponding to a respective relative orientations of the polarized filter to the document; identify a feature of the document; and output, in response comparing respective visual characteristics of the feature of the document to corresponding expected visual characteristics of the first feature for the document, an indication of a verification of the document.

20 Claims, 12 Drawing Sheets

(51) Int. Cl.
  *G07D 7/17*  (2016.01)
  *G02B 27/28*  (2006.01)
  *G02B 30/27*  (2020.01)

(52) U.S. Cl.
  CPC ..... *G06K 9/00449* (2013.01); *G06K 9/00456* (2013.01); *G07D 7/17* (2017.05)

(58) Field of Classification Search
  CPC .... G07D 7/17; H04N 1/0061; H04N 1/00615; H04N 1/00607; H04N 1/00602; H04N 1/00912; H04N 1/1061; H04N 5/238; G03G 15/5016; G03G 15/5041; G03G 15/5091; G03G 15/5079; G03G 15/2028; G03G 15/2039; G03G 15/0142; G03G 15/0435
  See application file for complete search history.

(56) References Cited

U.S. PATENT DOCUMENTS

| | | | |
|---|---|---|---|
| 4,741,047 A * | 4/1988 | Sharpe, II | H04N 1/2175 358/1.9 |
| 5,079,588 A | 1/1992 | Ohira et al. | |
| 5,119,130 A | 6/1992 | Tsudaka et al. | |
| 5,430,664 A * | 7/1995 | Cargill | G07F 19/20 194/207 |
| 5,594,225 A * | 1/1997 | Botvin | G06Q 20/04 235/379 |
| 5,761,089 A * | 6/1998 | McInerny | G07D 7/12 702/128 |
| 5,944,927 A * | 8/1999 | Seifert | D21H 21/42 156/153 |
| 6,401,206 B1 * | 6/2002 | Khan | H04L 9/3231 713/176 |
| 6,598,870 B2 | 7/2003 | Hanano | |
| 6,770,898 B1 * | 8/2004 | Wilson | B41M 3/14 250/556 |
| 6,801,907 B1 * | 10/2004 | Zagami | G07C 9/253 |
| 7,133,167 B2 | 11/2006 | Ouchi et al. | |
| 7,712,673 B2 * | 5/2010 | Jones | G06K 19/18 235/492 |
| 8,689,868 B2 | 4/2014 | Lerche et al. | |
| 9,291,933 B2 | 3/2016 | Hirano | |
| 9,357,090 B2 | 5/2016 | Hozono | |
| 9,432,538 B2 | 8/2016 | Kobayashi | |
| 10,031,456 B1 | 7/2018 | Shokai | |
| 10,475,038 B1 * | 11/2019 | Osborn | G06K 9/00442 |
| 2011/0090427 A1 | 4/2011 | Ohue et al. | |
| 2014/0052636 A1 | 2/2014 | Mattes | |
| 2018/0107100 A1 | 4/2018 | Ghabour | |
| 2020/0167781 A1 * | 5/2020 | Osborn | G06K 9/00442 |

* cited by examiner

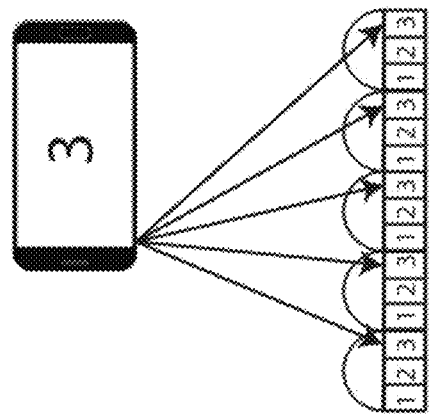
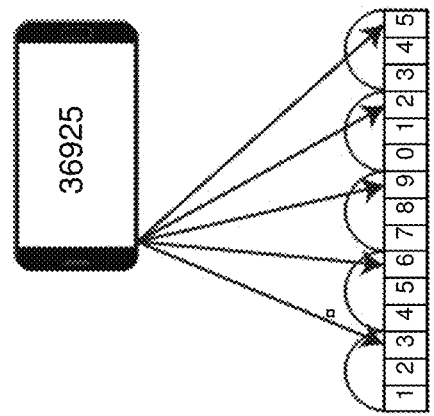
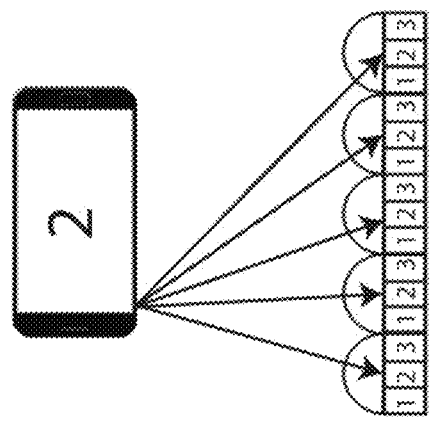
*FIG. 11A*
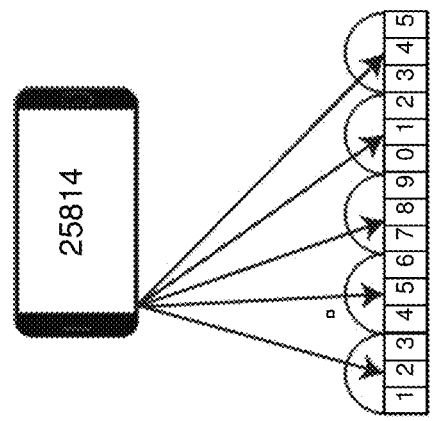
*FIG. 11B*
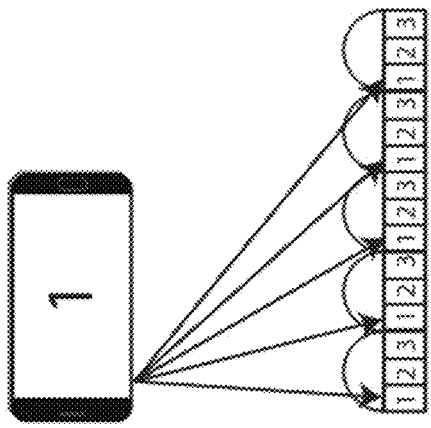
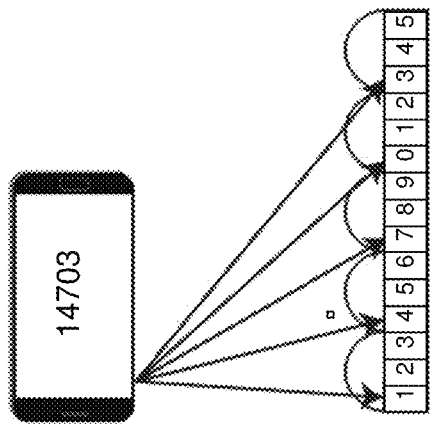

SYSTEMS AND METHODS FOR VISUAL VERIFICATION

CROSS REFERENCE TO RELATED APPLICATION

This application is a continuation of, and claims priority under 35 U.S.C. § 120 to, U.S. patent application Ser. No. 16/199,302, filed Nov. 26, 2018, the entire contents of which are fully incorporated herein by reference.

FIELD

The disclosed technology generally relates to visual verification, and, more particularly, to remote and/or automatic visual verification based on visual changes to an item across one or more images of the item.

BACKGROUND

In-person, human verification of documents is relatively straight-forward. An individual provides a document (e.g., an identification (ID) or a credit card) to a third-party, and the third-party inspects (e.g., visually and tactilely) and verifies the document. However, such verification is subject to human error and malfeasance, as well as the cost of paying, training, and supervising human inspectors. Accordingly, the traditional observations may be inefficient and improved automatic systems and method for document verification are desirable.

Moreover, such traditional verification is not possible using remote systems. Meanwhile, the rise of internet transactions and smart phones has increased a need for remote verification of documents. For instance, to prove a purchaser owns a credit card used for a transaction, the user enters the card number, billing address, and card verification value (CVV). However, this information could be discovered and relayed by third parties and used to conduct a fraudulent purchase. Therefore, the use of a single type of verification (i.e., something you know) is insufficient to verify documents remotely. Thus, certain related art solutions require the provision of a photo of the document for verification verified. Continuing with the transaction example, not only must a purchaser provide the card number, billing address, and card verification value (CVV), the purchaser must also provide an image of their credit card. A transaction server validates the card for use in the transaction by verifying the provided information and by using image analysis on the image of the credit card. However, both person- and computer-based image analysis may be fooled by an image of copy a card or other document (e.g., a photocopy). For example, it may be difficult for a computer to differentiate between a picture of a credit card and a picture of a picture of the credit card.

Accordingly, there is a need for improved verification that may work either remotely or automatically.

BRIEF SUMMARY

The disclosed technology includes systems and methods for visual verification. In certain example implementations, the disclosed technology includes a system for visual verification. The system may include: a document holder configured to receive a document; one or more optical sensors directed toward the document holder; one or more processors; and at least one memory having stored thereon computer program code that, when executed by the processor, instructs the processor to: control the one or more optical sensors to capture a plurality of images of the document within the document holder; identify a feature of the document within each of the plurality of images, the feature having visual characteristics that differ based on an angle at which the feature is viewed; and output, in response comparing the respective visual characteristics of the feature of the document in each of the plurality of images to corresponding expected visual characteristics of the feature for the document, an indication of a verification of the document.

The system may include a plurality of optical sensors disposed about the document holder.

The system may include a motor configured to rotate the document holder. The computer program code may further instruct the processor to control the motor to rotate the document holder while controlling the one or more optical sensors to capture the plurality of images.

The system may include a motor configured to move the one or more optical sensors about the document holder. The computer program code may further instruct the processor to control the motor to move the one or more optical sensors while controlling the one or more optical sensors to capture the plurality of images.

The computer program code may further instruct the processor to estimate, for each of the plurality of images and based on a relative positioning of the document holder to the one or more image sensors, the respective viewing angle of the document within each of the plurality of images.

The comparing may include comparing, for each of the plurality of images, the respective visual characteristics of the feature of the document to the corresponding expected visual characteristics at the respective estimated viewing angle of the document.

The plurality of images may include a sequence of images, and the matching may further include matching a sequence of the respective visual characteristics of the feature of the document within the sequence of images to an expected sequence of the expected visual characteristics for the sequence of image.

There may be provided a method including: receiving a plurality of images of a document, each of the plurality of images having a respective perspective of the document; identifying a feature of the document visible within each of the plurality of images, the feature having visual characteristics that differ based on a perspective at which the feature is viewed; and outputting, in response comparing the respective visual characteristics of the feature of the document in each of the plurality of images to corresponding expected visual characteristics of the feature of the document, an indication of verification of the document.

The feature may include one or more lenticular lens, and a geometry of the one or more lenticular lenses is assigned to document.

The method may further include receiving an indication of the identity of the document; and determining an expected geometry of the lenticular lens based on the identification of the document. The comparing may be based on the expected geometry of the lenticular lens.

The feature may include one or more lenticular lenses. At least one of a shape and a number of lenticular lenses may be assigned to the document. The method may further include: receiving an indication of an identity of the document; and determining at least one of an expected shape or an expected number of the one or more lenticular lenses based on the indicated identity.

The comparing may be based on the at least one expected shape or expected number of the one or more lenticular lenses.

The visual characteristics of the feature may be assigned to the document. The method may further include: receiving an indication of an identity of the document; and determining the expected visual characteristics for the feature based on the indicated identity.

The method may further include estimating, for each of the plurality of images, a respective viewing angle of the document within each of the plurality of images. The comparing may include comparing, for each of the plurality of images, the visual characteristics of the feature to the corresponding expected visual characteristics at the respective estimated viewing angle of the document.

The feature may include a hologram or a physical three-dimensional feature.

The plurality of images may include a video.

The comparing may include comparing an order of the visual characteristics of the feature in the video to an expected order based on a relative motion of the document within the video.

The document may include a credit card.

The visual characteristics of the feature may include a machine-readable code.

The document may include a plurality of features, respective visual characteristics of each of the plurality of features being different based on a perspective at which the respective feature is viewed. The method may include: identifying each of the plurality of features of the document within the plurality of images; and outputting, in response to comparing the respective visual characteristics of each of the features to corresponding respective expected visual characteristics for the respective feature, the indication of verification of the document.

The method may include estimating, for each of the plurality of images, a respective viewing angle of the document within each of the plurality of images. The comparing may include comparing, for each of the plurality of images, the respective visual characteristics of each of the respective features to the corresponding expected visual characteristics at the respective estimated viewing angle.

There may be provided a method of verifying a document containing a feature with visual characteristics that differ based on an orientation of a polarized filter, the method including: observing the document through a polarized filter; rotating at least one of the polarized filter and the document to rotate the orientation of the polarized filter with respect to the feature of the document; comparing changes to visual characteristics of the feature to expected visual characteristics of the feature in view of the relative orientation of the polarized filter; and verifying the document based on the comparing.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIGS. 11A and 11B illustrate a feature including a lenticular lens according to example embodiments.

DETAILED DESCRIPTION

Figure 1:
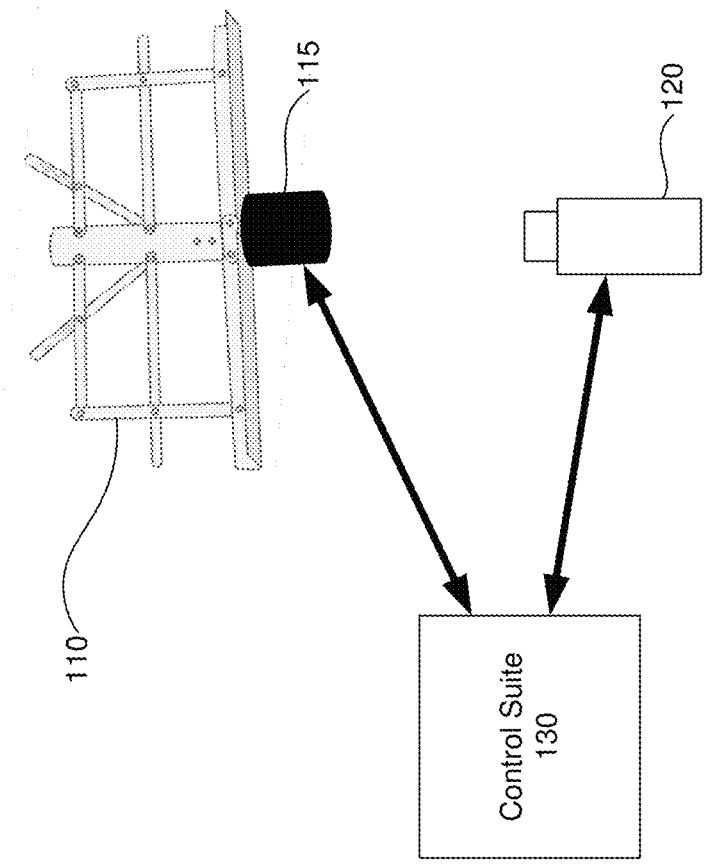
FIGS. 1-5 illustrate visual-verification systems according to one or more example embodiments.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

A visual-verification system is disclosed herein. According to an example implementation of the disclosed technology, the visual-verification system includes at least one camera configured to capture a plurality of images of a document, each image of the document including a same document feature that varies in its visual characteristics between the images. Aspects of the images may be varied based on certain capture conditions of the image. As non-limiting examples, one or more of lighting variations (e.g., direction, color, intensity, or place on spectrum), viewing position or angle of document, polarization direction of polarized lens, and diffraction patterns reflecting light at different angles. In some cases, information (e.g., machine-readable codes) can be encoded in multi-spectral features (features that reflect different wavelengths of light, such as Ultra-Violet inks). The visual-verification system may be configured to adjust the capture conditions of the various images (e.g., change the conditions at the time of image capture). Once captured, the visual-verification system analyzes the images and the representation of the feature within the images.

In some cases, an observation angle of the document may be estimate, for example, through inertial tracking and/or one or more Simultaneous Localization and Mapping (SLAM) techniques. As a non-limiting example, in some cases, a viewing angle of one image of a sequence of images may be identified based on specific characteristics of the image. For example, in all documents of a particular type (e.g., all credit cards), a first feature may only be visible at a substantially a straight-on view. With a viewing angle of one image being determined, viewing angle estimates of the other images may be calculated through inertial tracking and/or SLAM techniques (e.g., a mono-SLAM technique).

As one of ordinary skill will understand, a mono-SLAM technique may generally be understood as constructing stereo images from successive images (e.g., video frames) and performing stereophotogrammetry to assess position and distance from target object. These estimates may be used to estimate differences in viewing angles between the images (e.g., providing a basis for a change in viewing angle). Furthermore, one of ordinary skill will understand that inertial tracking may be thought of as projecting an object's position by analyzing the object's acceleration over time (e.g., by integrating the object's acceleration, and adding a first velocity constant to determine the object's velocity, then integrating the object's velocity and adding a second position constant to determine the object's position). For example, a camera (e.g., a smartphone) may capture images and its own acceleration simultaneously; by analyzing the camera's acceleration, the relative positioning between images may be determined (e.g., providing a basis for a change in viewing angle).

The visual-verification system confirms that the visual characteristics of the document feature vary between the images as expected. For example, the visual-verification system may determine that the visual characteristics of the feature are different between the images, vary according to expectations (e.g., the images collectively include expected visual variations of the feature), and/or vary as expected based on respective capture conditions (e.g., lighting, angle, and polarization). In some instances, the images may be an ordered set of images, and the visual-verification system may confirm that the visual variation of the feature between the ordered set of images varies in accordance with expected changes within the ordered set. In some cases, the plurality of images may be a video of the document with varying capture conditions. Once the changes to the visual characteristics of the document are confirmed, the visual-verification system verifies the document.

FIG. 1 depicts an example visual-verification system 100 according to an example embodiment. The visual-verification system 100 includes a document holder 110, a document holder motor 115, an image sensor 120 (e.g., a camera), and a control suite 130 (e.g., a processor and memory). The document holder 110 is configured to hold a document (e.g., a credit card) that includes a feature that visually changes based on viewing conditions. As non-limiting examples, the document holder may be a platform, a sleeve, a slot, a clip, a tilting platform, or a vacuum holder. The image sensor 120 is configured to capture a plurality of images (e.g., a series of images or a video) of a document held by the document holder 110. The document holder motor 115 is configured to rotate and/or move the document holder 110. For example, the document holder motor 115 may rotate the document holder or move the document holder 110 so that the image sensor 120 may capture a plurality of images of a document from different angles.

The control suite 130 is configured to control the document holder motor 115 and the image sensor 120 to capture a plurality of images of the document from a plurality of different viewing angles. In some cases, the control suite 130 may further process the plurality of images to verify the document. For example, as discussed below in greater detail with reference to FIGS. 6 and 7, the control suite 130 may identify a document feature present in each of the images, and determine whether visual characteristics of the document feature within the images vary as expected for the document. As non-limiting examples, the document feature may include one or more of a lenticular lens, a hologram, and a physical three-dimensional feature. In some cases, the control suite 130 may develop a model of the document feature (e.g., a three-dimensional model of a three-dimensional feature) based on the plurality of images, and compare the built model to an expected model for the document. In some embodiments, the control suite 130 may transmit representations of the plurality of images (or portions and/or subsets thereof) to an external device, the external device being configured to analyze the images to verify the document.

Figure 2:
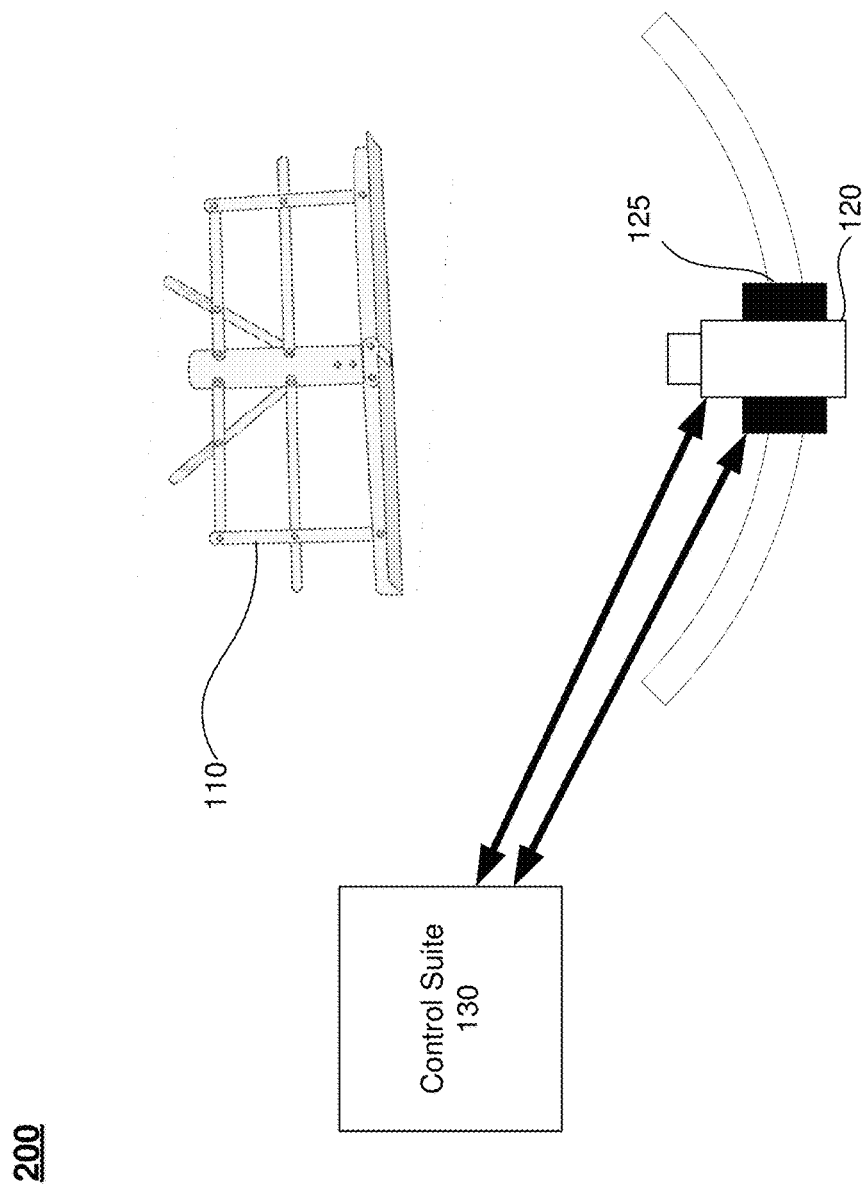

FIG. 2 depicts an example visual-verification system 200 according to another example embodiment. The visual-verification system 200 includes a document holder 110, an image sensor 120, an image sensor motor 125, and a control suite 130. The document holder 110, image sensor 120, and control suite 130 may be configured substantially similarly that that described above with reference to FIG. 1. In the visual-verification system 200, the control suite 130 may control the image sensor motor 125 to move the image sensor 120 (e.g., along a track), so that the image sensor 120 may capture images of a document held by the document holder along different angles.

Figure 3:
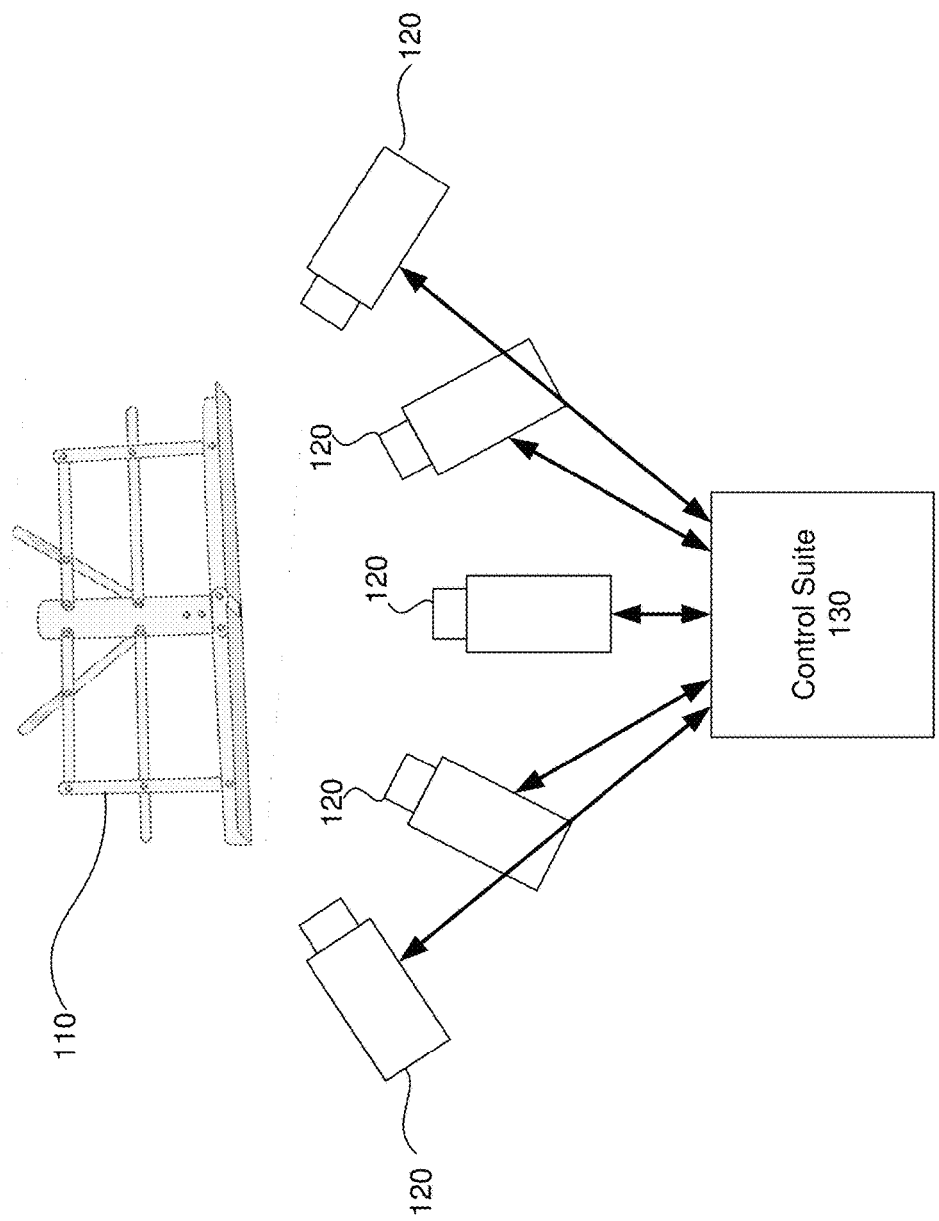

FIG. 3 depicts an example visual-verification system 300 according to another example embodiment. The visual-verification system 300 includes a document holder 110, a plurality of image sensors 120 disposed about the document holder 110, and a control suite 130. The document holder 110, plurality of image sensors 120, and control suite 130 may be configured substantially similarly that that described above with reference to FIGS. 1 and 2. However, as the plurality of image sensors 120 are disposed about the document holder 110, they may capture a plurality of images of the document from different viewing angles without requiring movement of one or more of the document holder 110 and the image sensors 120.

Figure 4:
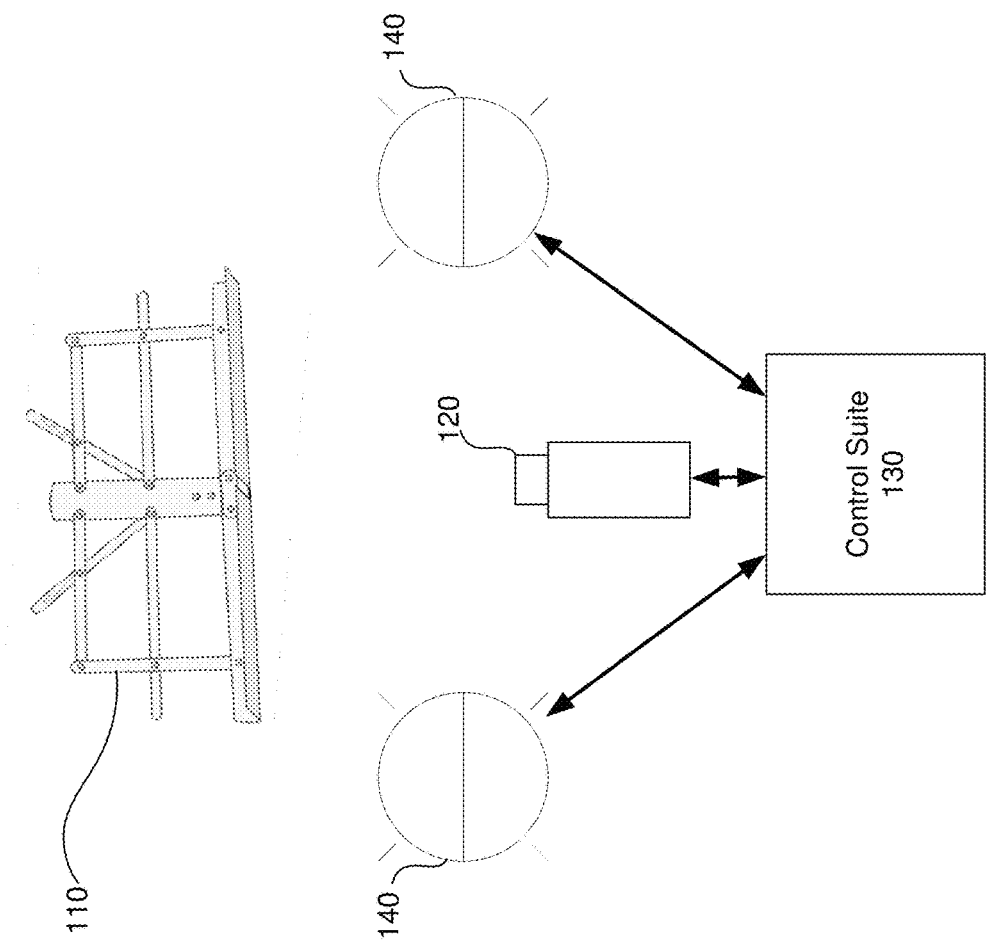

FIG. 4 depicts an example visual-verification system 400 according to another example embodiment. The visual-verification system 400 includes a document holder 110, an image sensor 120 disposed about the document holder 110, a control suite 130, and one or more lighting sources 140. The document holder 110, image sensor 120, and control suite 130 may be configured substantially similarly that that described above with reference to FIGS. 1-3. The one or more light sources 140 may be configured to provide (e.g., under the control of the control suite 130) different lighting conditions (e.g., lighting direction, lighting color, lighting intensity, and lighting spectrum (e.g., visual, infrared, ultraviolet)). In the visual-verification system 400, the control suite 130 may control the one or more light sources 140 so that the image sensor 120 may capture images of a document held by the document holder 110 with different visual characteristics.

Figure 5:
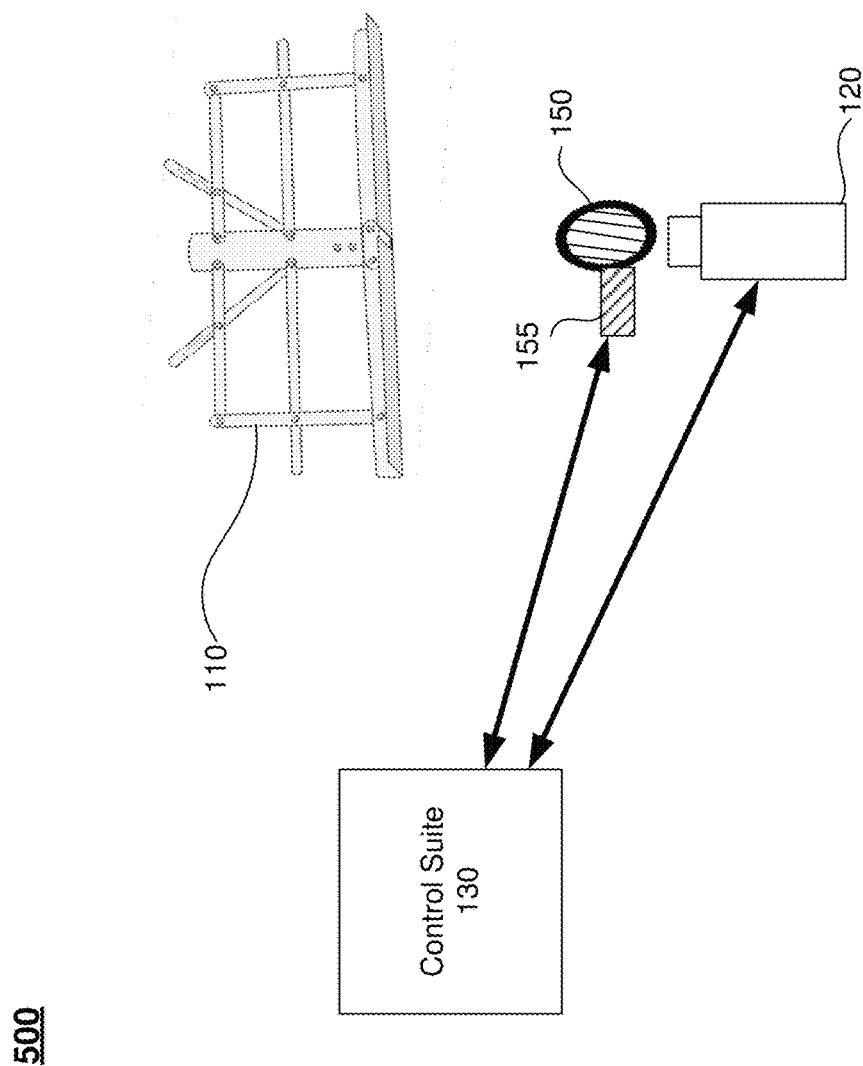

FIG. 5 depicts an example visual-verification system 500 according to another example embodiment. The visual-verification system 500 includes a document holder 110, an image sensor 120 disposed about the document holder 110, a control suite 130, one or more polarized lens 150, and a lens motor 155. The document holder 110, image sensor 120, and control suite 130 may be configured substantially similarly that that described above with reference to FIGS. 1-4. The one or more polarized lenses may filter a view of the document captured by the image sensor 120. In the visual-verification system 500, the control suite 130 may control the lens motor 155 to rotate the polarized lens 150 so that the image sensor 120 may capture images of a document held by the document holder 110 with different polarization characteristics. For example, images of a document feature may have different visual characteristics based on a relative polarization direction of the polarized lens 150 relative to the feature.

One of ordinary skill will understand that various combinations of the elements of the visual-verification systems 100-500 discussed above may be utilized in a visual-verification system, and such combinations are within the scope of the present disclosure. For example, in some embodiments, the visual verification system may have one or more of a document holder 110, a document holder motor 115, one or more image sensors 120, one or more image sensor motors 125, a control suite, 130, one or more lighting sources 140, one or more polarized lenses 150, and one or more lens motors 155.

Figure 6:
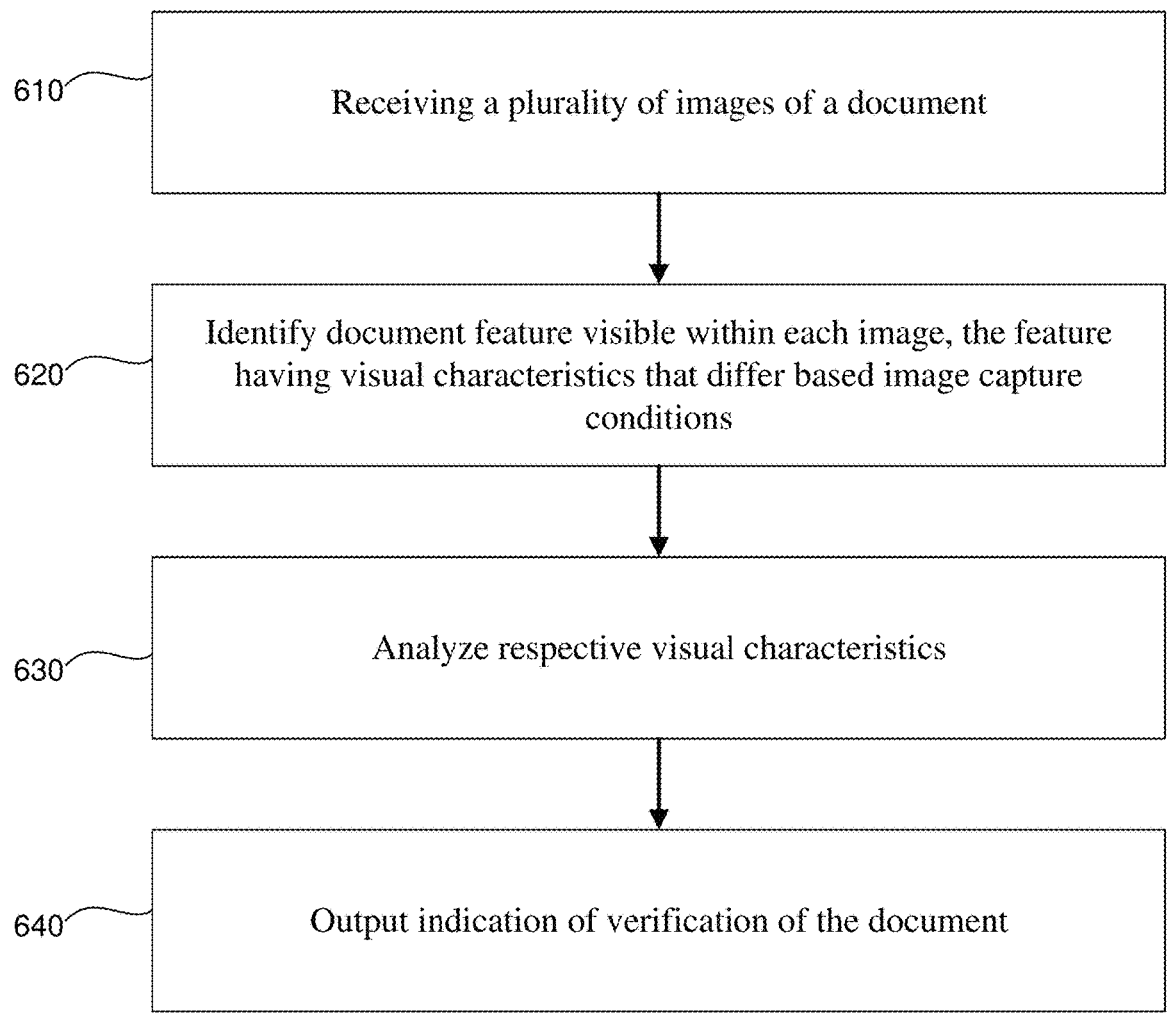
FIGS. 6-9 are block diagrams of methods according to aspects of one or more example embodiments.

FIG. 6 is a flowchart 600 of a method according to an example embodiment. The method may be performed, for example, by a processor of a control suite 130 or a verification server (see, e.g., FIG. 12 (1220)). However, one of ordinary skill will understand that this is merely an example, and various alternative devices may be configured to perform the method described with reference to FIG. 6. At 610, the processor receives a plurality of images of a document. In some implementations, the processor may control an image sensor (e.g., a camera) to capture a plurality of images of the document. The document may be, for example, a credit card, a debit card, an identification (ID), or an official document (e.g., a deed or title). The images of the plurality of images have differing capture conditions. The plurality of pictures may be, for example, a video or a series of images. As non-limiting example, the capture conditions may include one or more of lighting variations (e.g., direction, color, intensity, or place on spectrum), capture position or view of the document, and polarization orientation of a polarized lens. The variation in the capture conditions may be predetermined (e.g., based on a known type of feature) or multiple types of changes to capture conditions may accommodate one or more different types of features. In some cases, the processor may control variations to the capture conditions at the time of capture or be notified of capture conditions corresponding to specific images of the plurality of images.

At 620, the processor identifies a feature of the document that is visible within each of the plurality of images (or a subset thereof). The feature may have differing visual characteristics based on viewing/capture conditions. For example, the processor may identify a predetermined location of the document that corresponds to an expected location of the feature. In some cases, the processor may analyze one or more of the plurality of images to determine a location of the feature. In some implementations, the processor may identify the feature by determining a portion of the document that changes between the plurality of images.

As non-limiting examples, the document feature may include one or more of a lenticular lens, a hologram, a polarized feature, a physical three-dimensional feature, and a light-reactant feature. If the feature includes a lenticular lens, a hologram, or a three-dimensional feature, the feature will have different visual characteristics based on a viewing angle (e.g., perspective or image capture position), and the plurality of images may be captured from different viewing angles of the document. In a case where the feature includes a polarized feature, the feature will have different visual characteristics based on a relative orientation of a polarized lens, and the plurality of images may be captured using different rotational orientations of a polarized lens to the document. In a case where the feature includes a light-reactant feature, the feature will have different visual characteristics based on a lighting conditions (e.g., light intensity, lighting angle, light color, or lighting spectrum (e.g., visual v. ultraviolet)), and the plurality of images may be captured using different lighting conditions of the document.

At 630, the processor analyzes the visual characteristics of the feature in the plurality of images. For example, the processor may compare the respective visual characteristics of the feature of the document in each of the plurality of images to corresponding expected visual characteristics of the feature of the document.

As a non-limiting example, the feature may include one or more lenticular lenses. One of ordinary skill will understand that lenticular lenses provide different views of an underlying item (e.g., substrate, image, or object). For example, FIGS. 11A and 11B illustrate example lenticular animations. FIG. 11A illustrates a lenticular animation that includes views of three numbers (1, 2, or 3) based on a viewing position. The processor may identify, within a plurality of images, a portion of the document that includes the lenticular lens, and determine whether the visual characteristic (e.g., visible number) is different in different images. One of ordinary skill will understand that the lenticular animation illustrated in FIG. 11A is merely an example, and in some cases two or four or more views may be possible. Further, while differing numbers may correspond to different viewing angles for a lenticular lens, this is merely an example, and various symbols, images, or computer readable codes (e.g., QR codes or bar codes) may be viewable based on a viewing angle. In addition, in some cases, a plurality of different elements (e.g., more than one number) may be associated with a same viewing position for different lenticular lenses (see, e.g., FIG. 11B).

As another example, the feature may be a three-dimensional structure. The different images may provide differing views of a surface of the feature. In some cases, the differing views may be combined into a three-dimensional model, and the model may be analyzed to determine whether the document is verified.

In a case where the visual characteristics of the feature include machine-readable code, the analyzing may include processing the code. As non-limiting examples, the machine-readable code may include one or more of one-dimensional barcodes (e.g., liner barcodes), two-dimensional barcodes (e.g., a matrix bar code such as a QR Code®), or steganographic binary codes (e.g., codes hidden within images).

At 640, the processor outputs an indication as to whether the document is verified, for example, based on the analysis at 630. In some cases, for example, where the document is a financial instrument (e.g., credit card), the indication may include a transaction approval.

Figure 7:
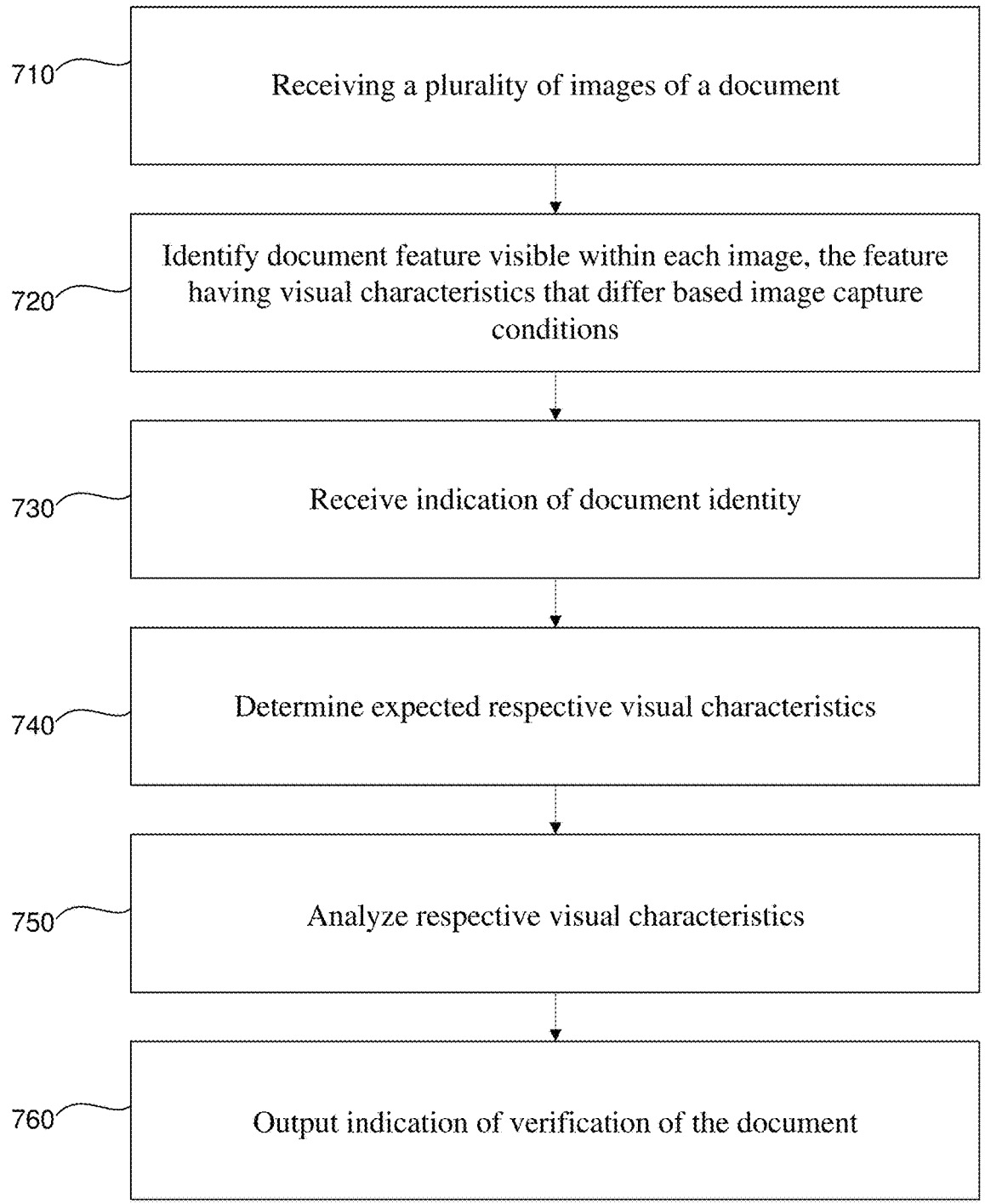

FIG. 7 is a flowchart 700 of a method according to an example embodiment. The method may be performed, for example, by a processor of a control suite 130 or a verification server (see, e.g., FIG. 12 (1220)). However, one of ordinary skill will understand that this is merely an example, and various alternative devices may be configured to perform the method described with reference to FIG. 7. At 710, the processor receives a plurality of images of a document. Receiving the plurality of images may be substantially similar to that described above with reference to FIG. 6 (610). At 720, the processor identifies a feature of the document that is visible within each of the plurality of images. Identifying the feature of the document may be substantially similar to that described above with reference to FIG. 6 (620).

At 730, the processor receives an indication of an identity of the document. In some cases, the indication of the identity may be received with the plurality of images (e.g., from a user device capturing the images or from a transaction server). In some embodiments, the processor may analyze one or more images of the document determine the document's identity. For example, if the document is a credit card, the processor may (utilizing optical character recognition (OCR)) determine a name and account number of the credit card. In some implementations, the document may include an indication of its identity (e.g., through machine-readable code), and the processor may analyze the images to determine the document's identity. In some cases, the document's feature may indicate the document's identity. In some cases, the processor may identify markings or codes within the one or more images of the document, such as, as non-limiting examples, one- or -two-dimensional barcodes, a dot pattern, or lines in an abstract symbol.

At 740, the processor determines expected visual characteristics based on the identity of the document. In some cases, the document identity may be linked to specific features and/or specific feature visual characteristics that vary based on corresponding capture conditions of respective images.

For example, the feature may include a lenticular lens such as that illustrated in FIG. 11A. The predetermined visual characteristics may be the numbers 1, 2, and 3 in any order among a plurality of views. In some embodiments, the changes to visual characteristics must be sequentially predetermined in the plurality of images. For example, a video of a document with the lenticular animation illustrated in FIG. 11A must show the numbers changing from 1 to 2 and from 2 to 3 (or in reverse order). In some instances, the feature may include a hologram, and the predetermined visual characteristics may be predetermined images, symbols, or shapes illustrated in the hologram. One of ordinary skill will recognize that visual characteristics of different features may similarly be customized, assigned, or otherwise associated with particular documents or document classes.

In some cases, aspects of the feature may be further mapped to particular documents. For instance, if the feature includes a lenticular lens, a geometry (e.g., pitch, radius of curvature, thickness, substrate thickness) or index of refraction of the lenticular lens may be mapped to a specific document or class of documents. Accordingly, two documents with the same sequence of changes (e.g., numbers) may have different viewing conditions (e.g., angles) that corresponding to the respective numbers. Similarly, in some implementations, a number of lenticular lenses or lenticular cells may be mapped to a specific document. Thus, as a non-limiting example, some documents may only include one set of changing numbers, while other documents may include two or more sets of changing numbers. One of ordinary skill will recognize that aspects of features other than lenticular lenses may similarly be modified, customized, or assigned to particular documents or classes of documents.

In some cases, the particular views may be mapped to specific capture conditions of the images. For example, in a case of lenticular animations, holograms, or three-dimensional structures, certain viewing angles may be predetermined to map to specific visual characteristics (e.g., at a time of document creation). As other non-limiting examples, different visual characteristics may be mapped to specific polarization orientations, colors, or spectrum exposures.

In some implementations, the processor determines the capture conditions for respective images. For example, the processor may analyze the images to determine respective capture conditions, such as determining a capture perspective of the document for a given image (e.g., by line-tracing the document and/or feature in the image to determine a relative position and orientation). Image analysis may also determine a lighting color or intensity for a particular image. One of ordinary skill will recognize that these are merely examples, and various types of image analysis may be used to determine capture conditions of one or more images.

In some instances, the capture conditions of specific images may be provided to the processor (e.g., received with the plurality of images). In some cases (e.g., when the images are captured by a visual-verification system 100-500), the processor may determine capture conditions based on controls of different aspects of the capture conditions (e.g., by control commands to or states of one or more of a document holder motor 115, image sensor motor 120, lighting source 140, and lens motor 155) or by determining which of a plurality of image sensors 120 captured a particular image. As a non-limiting example, the processor may estimate a respective viewing angle of a document within each of the plurality of images based on a relative positioning of the document holder 110 to the image sensors.

At 750, the processor analyzes the visual characteristics of the feature in the plurality of images. For example, the processor may compare the visual characteristics of the feature within the plurality of images to the determined expected visual characteristics. In some cases, the expected visual characteristics of each image may be determined based on respective capture conditions (e.g., viewing angle, color., etc.), and the expected visual characteristics for each image may be compared to the actual visual characteristics of the feature within the corresponding images. In some cases, the plurality of images may be sequenced or comprise a video, and the analyzing may include matching a sequence of visual characteristics of the features (e.g., an order of the visual characteristics within the sequence of images or video) to an expected sequence for the particular document.

At 760, the processor outputs an indication as to whether the document is verified, for example, based on the analysis at 750.

One of ordinary skill will recognize that, in some embodiments, a document may comprise a plurality of features whose visual characteristics change based on same or different viewing conditions (e.g., capture conditions of images). In such cases, one or more systems or methods may include identifying one or more of the plurality of features within the plurality of images and analyzing the one or more identified features to verify a document. In some instances, multiple types of features may be combined (e.g., spatially contiguous or overlaid), such that a combination of different capture conditions may alter the visual characteristics of a feature. For example, a lenticular lens may also include a colorized feature, such that the visual characteristics vary based both on viewing perspective and lighting color. In some cases, the relative positioning of or distance between the plurality of features may be mapped to specific documents. In other words, in some embodiments, two documents may have the same features, but their relative positioning would be changed, thus further distinguishing and differentiating the documents, and providing additional points for document verification.

Figure 8:
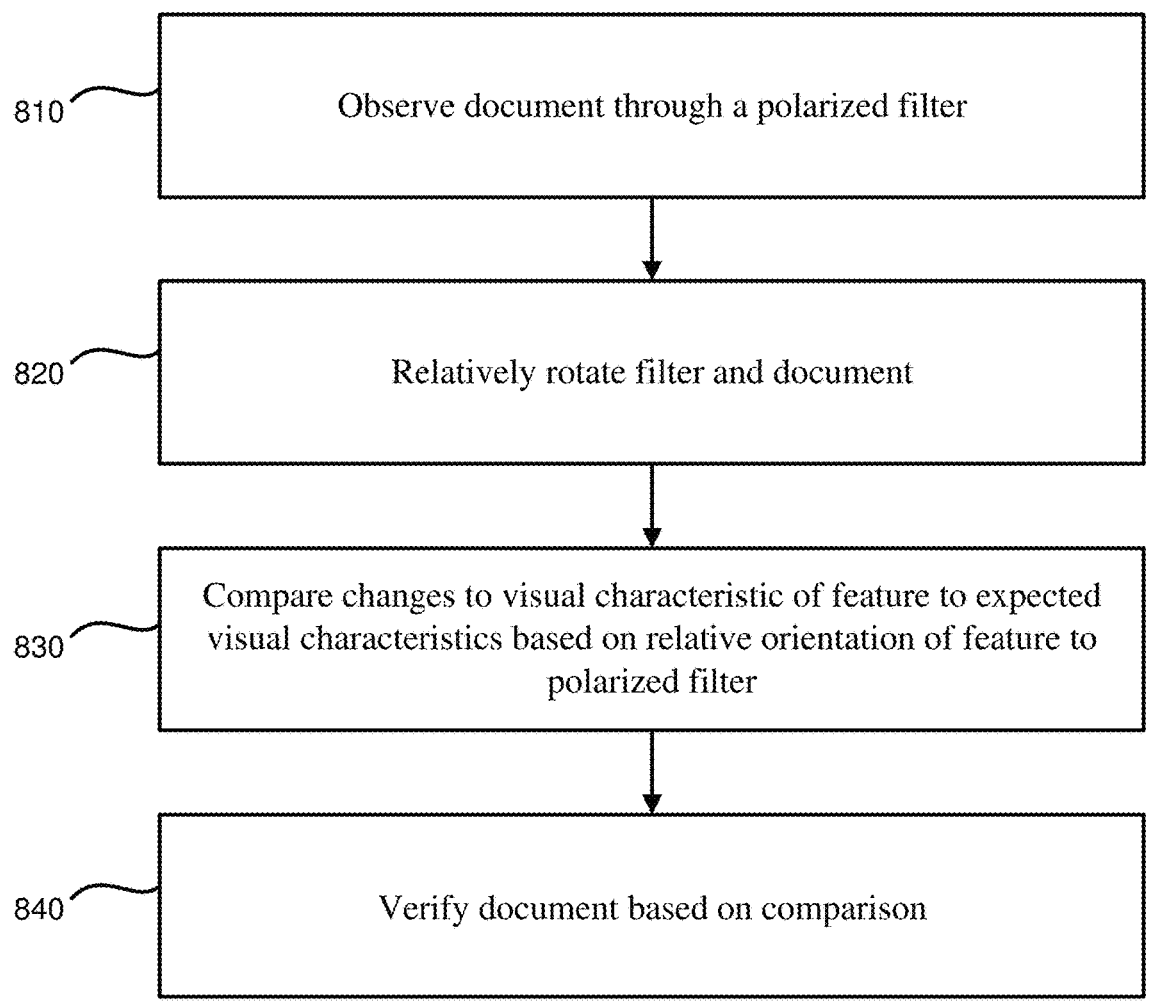

FIG. 8 is a flowchart 800 of a visual-verification method according to an example embodiment. At 810, a document is observed through a polarized filter. The document may be, for example, an ID, a credit card, a debit card, or an official document (e.g., a deed or title). The document may include a polarized feature whose visual characteristics change based on an orientation of a polarized view (e.g., a relative orientation of a polarized filter through which the document is viewed). At 820, at least one of the polarized filter and the document are rotated such that the relative orientation of the polarized filter to the document featured is changed. At 830, changes to visual characteristics of the feature are compared to expected visual characteristics of for changing relative orientation of the polarized filter. For example, the polarized feature may include two or more overlapping images that interfere with each other when viewed normally, but may be individually viewable based on a relative orientation of a polarized filter. In some implementations, the changes to the visual characteristics for a feature may be mapped to the document either generally (e.g., all documents from a particular source) or specifically (each document has its own specific combination of images). Based on the comparison, in a case where the comparison indicated that the document is legitimate, at 840, the document is verified.

Figure 9:
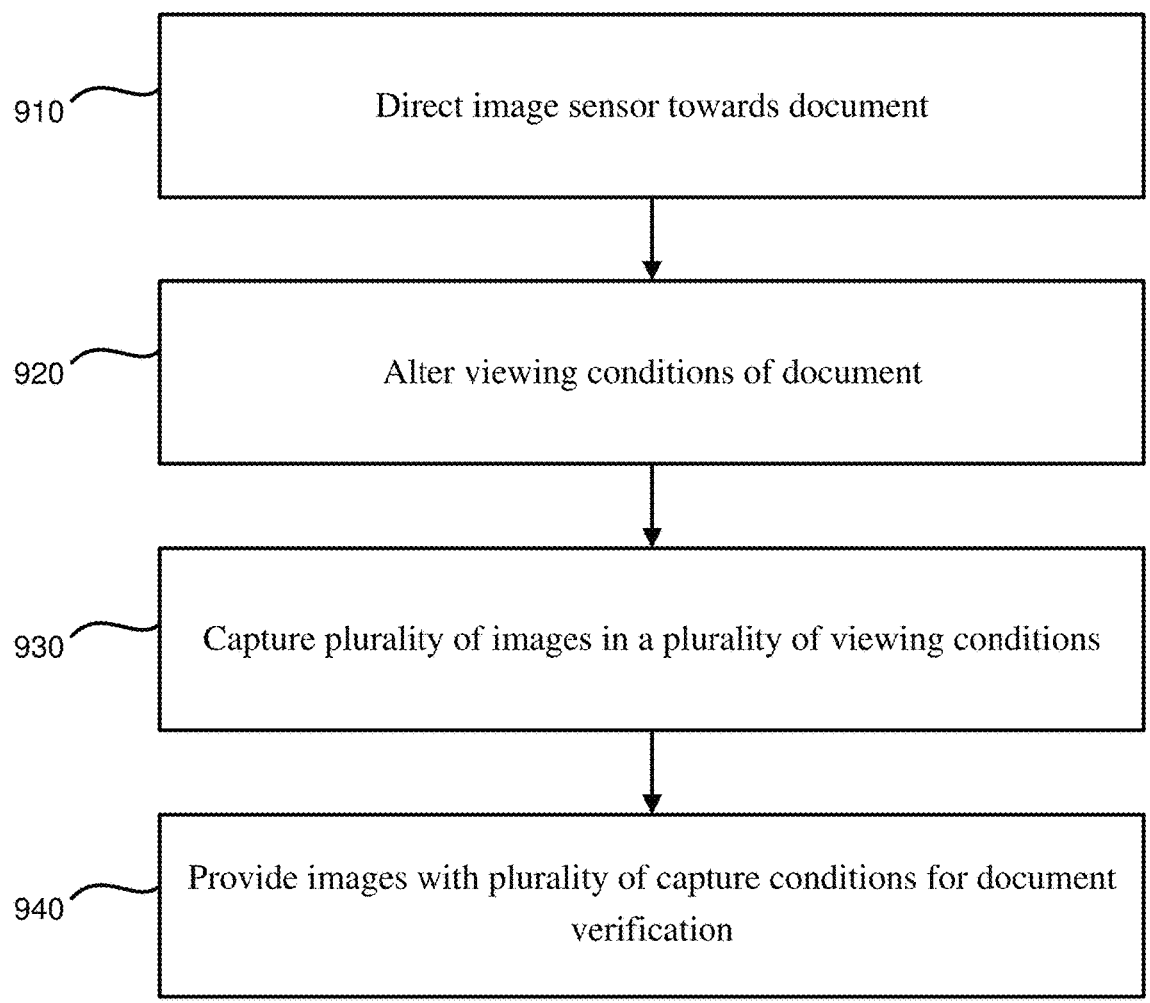

FIG. 9 is a flowchart 900 of a method according to an example embodiment. The method may be conducted, for example, by one or more of a visual-verification system (100-500), a user, or a user device (see, e.g., FIG. 12 (1210)). At 910, at least one image sensor is directed towards a document. At 920, viewing conditions of the document are altered. As non-limiting examples, altering the viewing conditions may include one or more of relatively rotating the document and image sensor, changing a viewing position of the image sensor (e.g., moving the image sensor), changing lighting conditions (e.g., color, intensity, and light spectrum), and changing a polarization direction of a polarized filter through which the image sensor views the document. At 930, the image sensor captures a plurality of images of the document under a plurality of viewing conditions (e.g., the altering viewing conditions and capturing images may be done simultaneously and/or interleaved). Accordingly, if the document includes a feature that changes based on the viewing conditions, the plurality of images will include differing visual characteristics of the feature based on respective capture conditions. At 940, the plurality of images (with differing capture conditions) are provided for document verification. For example, in a case of user device capturing the images, the plurality of images may be output for transmission to an image processing server or document verification server (see, e.g., FIGS. 12 (1220 and 1230)). In some cases, the plurality of images may be provided with indications of respective capture conditions and/or an identity (or supposed identity) of the document.

Figure 12:
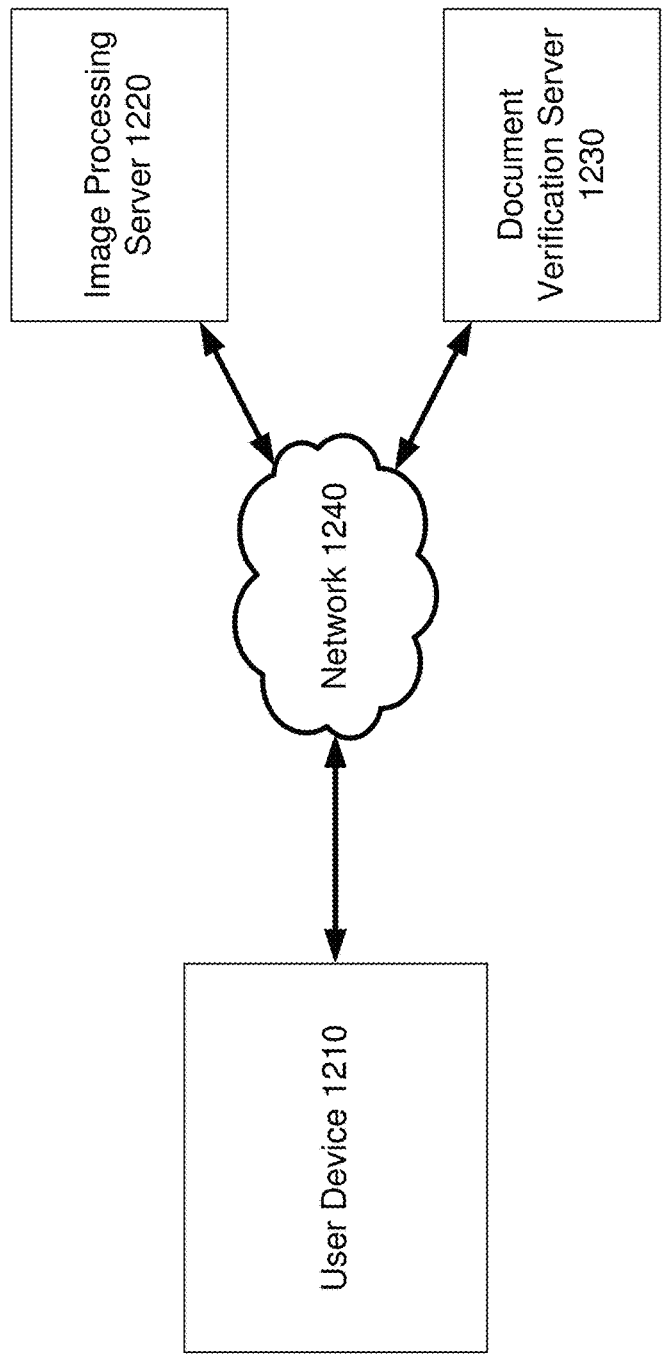
FIG. 12 illustrates an example environment for visual verification.

FIG. 12 illustrates an example environment 1200 in which certain aspects of the present disclosure may be implemented. The environment 1200 includes a user device 1210, an image processing server 1220, and a document verification server 1230. The user device 120, image processing server 1220, and document verification server 1230 may be connected over a network 1240. The user device 1210 may be, as a non-limiting example, a smartphone. The user device 1210 may be utilized to capture a plurality of images of a document under a variety of capture conditions (for example, as discussed above with reference to FIG. 9).

The image processing server 1220 may be configured to process images of the document received from the user device 1210. As a non-limiting example, the image processing server 1210 may be configured to identify a document feature within the one or more images. In some cases, the image processing server 1220 may extract information of the visual characteristics of the feature within the plurality of images and provide the same to the document verification server 1230. For example, if the visual characteristics include particular viewable numbers (see, e.g., FIGS. 11A and 11B), the image processing server 1220 may extract the viewable numbers of the feature from respective images and provide the same to the document verification server 1230. In some implementations, the image processing server 1220 may provide certain document identification information (e.g., a document identifier) or respective capture conditions (e.g., identified through image analysis) of the respective images to the document verification server 1230.

The document verification server 1230 compares the visual characteristics of the document feature identified by the image processing server 1220 to expected visual characteristics and provides an indication as to whether the document is verified. As a non-limiting example, the verification server 1230 may determine a purported identity of the document, identify expected visual characteristics of a feature of the identified document, and compare the expected characteristics to those determined by the image processing server 1220.

Although the image processing server 1220 and the document verification server 1230 are depicted as separate entities, one of ordinary skill will recognize that various features and configurations of the image processing server 1220 and the document verification server 1230 may be combined into one or more physical or logical devices.

Figure 10:
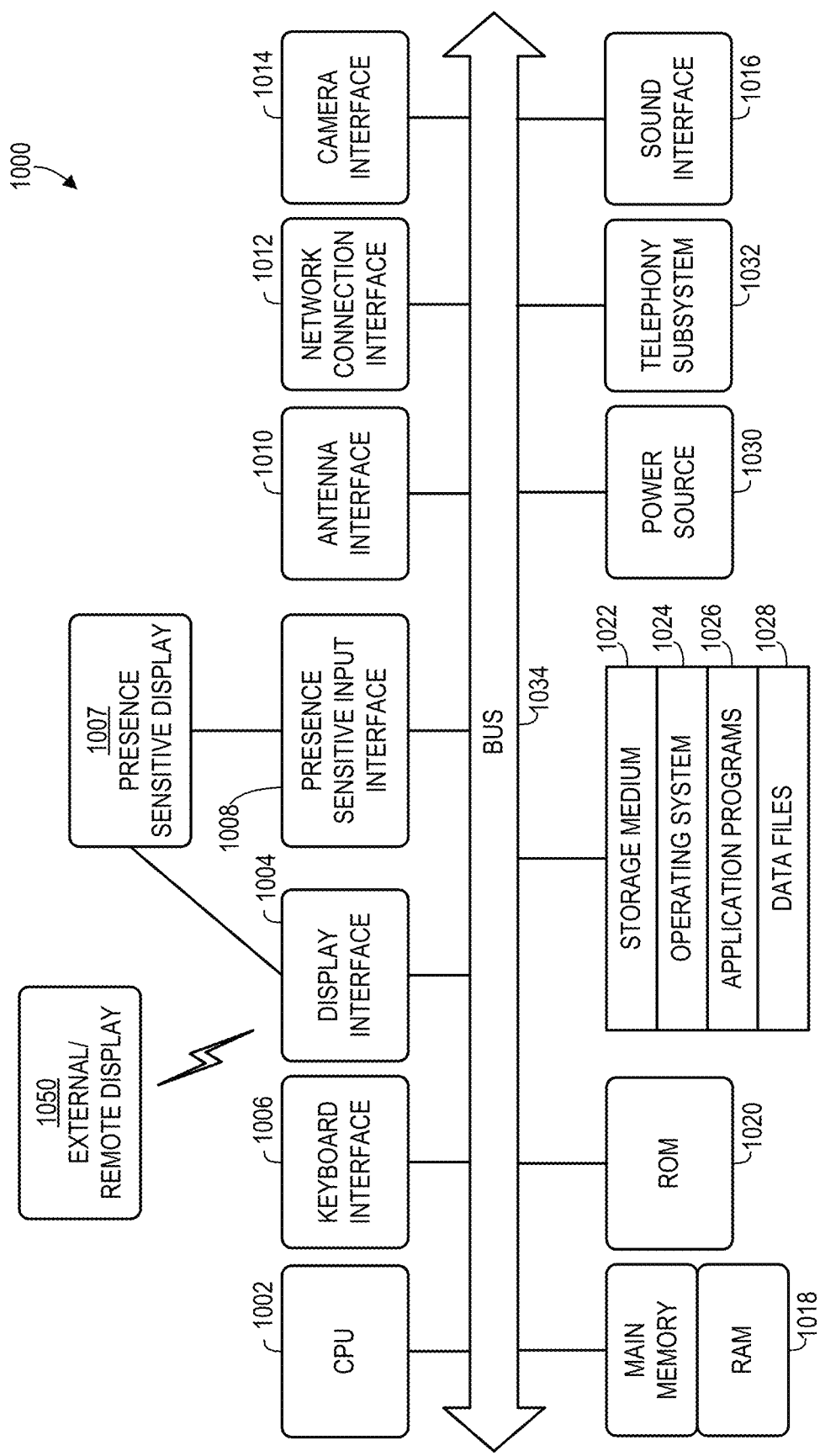
FIG. 10 is a block diagram of an example computer system capable of implementing certain aspects of the present disclosure.

FIG. 10 illustrates an example computing device architecture than can implement one or more aspects of a verification system 100-500, a user device 1210, an image processing server 1220, and a document verification server 1230, and a method according to the present disclosure. In some embodiments, the verification system 100-500, user device 1210, image processing server 1220, and document verification server 1230 may have fewer, alternative, or additional components as that illustrated in FIG. 10.

The computing device architecture 1000 of FIG. 10 includes a central processing unit (CPU) 1002, where computer instructions are processed, and a display interface 1004 that acts as a communication interface and provides functions for rendering video, graphics, images, and texts on the display. In certain example implementations of the disclosed technology, the display interface 1004 may be directly connected to a local display, such as a touch-screen display associated with a mobile computing device. In another example implementation, the display interface 1004 may be configured for providing data, images, and other information for an external/remote display 1050 that is not necessarily physically connected to the mobile computing device. For example, a desktop monitor may be used for mirroring graphics and other information that is presented on a mobile computing device. In certain example implementations, the display interface 1004 may wirelessly communicate, for example, via a Wi-Fi channel or other available network connection interface 1012 to the external/remote display 1050.

In an example implementation, the network connection interface 1012 may be configured as a communication interface and may provide functions for digital virtual assistant using voice, rendering video, graphics, images, text, other information, or any combination thereof on the display. In one example, a communication interface may include a microphone, camera, serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 1004 may be operatively coupled to a local display, such as a touch-screen display associated with a mobile device or voice enabled device. In another example, the display interface 1004 may be configured to provide video, graphics, images, text, other information, or any combination thereof for an external/remote display 1050 that is not necessarily connected to the mobile computing device. In one example, a desktop monitor may be used for mirroring or extending graphical information that may be presented on a mobile device. In another example, the display interface 1004 may wirelessly communicate, for example, via the network connection interface 1012 such as a Wi-Fi transceiver to the external/remote display 1050.

The computing device architecture 1000 may include a keyboard interface 1006 that provides a communication interface to a keyboard. In one example implementation, the computing device architecture 1000 may include a presence sensitive input interface 1008 for connecting to a presence sensitive display 1007. According to certain example implementations of the disclosed technology, the presence sensitive input interface 1008 may provide a communication interface to various devices such as a pointing device, a touch screen, a depth camera, microphone, etc. which may or may not be associated with a display.

The computing device architecture 1000 may be configured to use an input device via one or more of input/output interfaces (for example, the keyboard interface 1006, the display interface 1004, the presence sensitive input interface 1008, network connection interface 1012, camera interface 1014, sound interface 1016, etc.) to allow a user to capture information into the computing device architecture 1000. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 1000 or may be a separate device. For example, the input device may be an accelerometer, a magnetometer, a digital camera, a microphone, and an optical sensor.

Example implementations of the computing device architecture 1000 may include an antenna interface 1010 that provides a communication interface to an antenna; a network connection interface 1012 that provides a communication interface to a network. As mentioned above, the display interface 1004 may be in communication with the network connection interface 1012, for example, to provide information for display on a remote display that is not directly connected or attached to the system. In certain implementations, camera interface 1014 acts as a communication interface and provides functions for capturing digital images from a camera. In certain implementations, a sound interface 1016 is provided as a communication interface for converting sound into electrical signals using a microphone and for converting electrical signals into sound using a speaker. In certain implementations, a sound interface 1016 is utilized to capture voice inputs for consumption by of other components connected to the BUS 1034. According to example implementations, a random-access memory (RAM) 1018 is provided, where computer instructions and data may be stored in a volatile memory device for processing by the CPU 1002.

According to an example implementation, the computing device architecture 1000 includes a read-only memory (ROM) 1020 where invariant low-level system code or data for basic system functions such as basic input and output (I/O), startup, or reception of keystrokes from a keyboard are stored in a non-volatile memory device. According to an example implementation, the computing device architecture 1000 includes a storage medium 1022 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 1024, application programs 1026 (including, for example, a web browser application, a widget or gadget engine, and or other applications, as necessary) and data files 1028 are stored. According to an example implementation, the computing device architecture 1000 includes a power source 1030 that provides an appropriate alternating current (AC) or direct current (DC) to power components.

According to an example implementation, the computing device architecture 1000 includes a telephony subsystem 1032 that allows the computing device to transmit and receive sound over a telephone network. The constituent devices and the CPU 1002 communicate with each other over a bus 1034.

According to an example implementation, the CPU 1002 has appropriate structure to be a computer processor. In one arrangement, the CPU 1002 may include more than one processing unit. The RAM 1018 interfaces with the computer BUS 1034 to provide quick RAM storage to the CPU 1002 during the execution of software programs such as the operating system application programs, and device drivers. More specifically, the CPU 1002 loads computer-executable process steps from the storage medium 1022 or other media into a field of the RAM 1018 to execute software programs. Data may be stored in the RAM 1018, where the data may be accessed by the computer CPU 1002 during execution.

The storage medium 1022 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 1022, which may include a machine-readable storage medium.

According to one example implementation, the term computing device, as used herein, may be a CPU, or conceptualized as a CPU (for example, the CPU 1002 of FIG. 10). In this example implementation, the computing device (CPU) may be coupled, connected, and/or in communication with one or more peripheral devices, such as display. In another example implementation, the term computing device, as used herein, may refer to a mobile computing device such as a smart phone, tablet computer, or smart watch. In this example implementation, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

In the present description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Also, in describing example embodiments, certain terminology is used for the sake of clarity. It is intended that each term contemplates its broadest meaning as understood by those skilled in the art and includes all technical equivalents that operate in a similar manner to accomplish a similar purpose.

While certain embodiments of the disclosed technology have been described, it is to be understood that the disclosed technology is not to be limited to the disclosed example embodiments, but covers various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and to enable any person skilled in the art to practice the disclosed technology, including making and using any devices or systems and performing any incorporated methods. The patentable scope may include other examples that occur to those skilled in the art. Such other examples are intended to be within the scope of the claims if they have structural elements as the claims, or if they include equivalent structural elements with insubstantial differences from the literal language of the claims.

Example Use Cases

In certain example implementations, a customer is conducting an online purchase. To provide payment information, the customer uses a smartphone to take a video of their credit card, scanning the phone across the card. The smartphone uploads the video (or portions of the video) to a financial transaction server, which extracts thee payment information from the card (e.g., card number), and identifies a security feature of the credit card visible in the video. The security feature changes visual characteristics based on a viewing angle, such as a lenticular animation. Accordingly, the feature should be animated across the video. The financial transaction server compares the changes in the lenticular animation to expected changes for the particular credit card. If the changes in the video match expected changes, the financial server verifies the credit card and authorizes the transaction. In some cases, the financial transaction server identifies anti-fraud codes (e.g., CVV code) within the various views of the credit card, and further confirms that the anti-fraud code is correct for the particular credit card.

In certain example implementations, a security guard needs to verify the authenticity of an identification (ID). The ID is placed within a visual-verification machine, which captures a plurality of images of the ID under various capture conditions. The varying capture conditions may include one or more of a viewing angle of the ID, lighting conditions, or an orientation of a polarized filter. The visual-verification machine identifies a security feature of the ID visible within the plurality of images. The security feature changes visual characteristics based on capture conditions of the image. Accordingly, visual characteristics of the feature should be varied across the plurality of images. The visual-verification machine compares the changes to the visual characteristics of the feature across the plurality of images to expected changes for the ID (e.g., particularized to the ID or for documents generally). If the changes in the images match expected changes, the visual-verification machine authenticates the ID.

We claim:

1. A system comprising:
a document holder configured to receive a document;
an image sensor directed toward the document holder;
a polarized filter disposable between the image sensor and the document holder;
a filter motor configured to rotate the polarized filter;
one or more processors; and
at least one memory having stored thereon computer program code that, when executed by the one or more processors, instructs the one or more processors to:
control the filter motor to rotate the polarized filter;
control the image sensors to capture a first plurality of images of the document within the document holder, each of the first plurality of images corresponding to a respective relative orientation of the polarized filter to the document;
identify a first feature of the document within each of the first plurality of images, the first feature having visual characteristics that differ based on a relative orientation of the polarized filter to the first feature through which the first feature is viewed; and
output, in response comparing respective visual characteristics of the first feature of the document in each of the first plurality of images to corresponding expected visual characteristics of the first feature for the document, an indication of a verification of the document.

2. The system of claim 1, wherein the computer program code, when executed by the one or more processors, further instructs the one or more processors to determine, based on an identity of the document, the expected visual characteristics of the first feature for the document, the expected visual characteristics differing based on a relative orientation of a polarized filter to the first feature through which the first feature is viewed.

3. The system of claim 1, wherein
the computer program code, when executed by the one or more processors, further instructs the one or more processors to estimate, for each of the first plurality of images and based on a relative orientation of the document holder to the polarized filter, the respective relative orientation of the polarized filter to the document within each of the first plurality of images, and
the comparing comprises comparing, for each of the first plurality of images, the respective visual characteristics of the first feature of the document to the corresponding expected visual characteristics at the respective estimated relative orientation of the polarized filter to the document.

4. The system of claim 1, wherein
the first plurality of images comprises a sequence of images, and
the comparing comprises matching a sequence of the respective visual characteristics of the first feature of the document within the sequence of images to an expected sequence of the expected visual characteristics for the sequence of images.

5. The system of claim 1 further comprising a sensor motor configured to move the image sensor about the document holder,
wherein the computer program code, when executed by the one or more processors, further instructs the one or more processors to:
control the sensor motor to move the image sensor about the document holder;
control the image sensor to capture a second plurality of images of the document within the document holder from a plurality of different viewing angles;
identify a second feature of the document within each of the second plurality of images, the second feature having visual characteristics that differ based on an angle at which the second feature is viewed; and
compare the respective visual characteristics of the second feature of the document in each of the second plurality of images to expected visual characteristics of the second feature for the document, and
wherein outputting the indication of a verification of the document is further in response comparing the respective visual characteristics of the second feature of the document in each of the second plurality of images to the corresponding expected visual characteristics of the second feature for the document.

6. The system of claim 5, wherein
the computer program code, when executed by the one or more processors, further instructs the one or more processors to estimate, for each of the second plurality of images and based on a relative positioning of the document holder to the image sensor, a respective viewing angle of the document within each of the second plurality of images, and
the comparing comprises comparing, for each of the second plurality of images, the respective visual characteristics of the second feature of the document to corresponding expected visual characteristics at the respective estimated viewing angle of the document.

7. The system of claim 5, wherein
the second plurality of images comprises a sequence of images, and
the comparing further comprises matching a sequence of the respective visual characteristics of the second feature of the document within the sequence of images to an expected sequence of the expected visual characteristics for the sequence of images.

8. The system of claim 5, wherein the first plurality of images and the second plurality of images are an overlapping set of images.

9. The system of claim 5, wherein the first feature and the second feature are a same feature.

10. A method comprising:
receiving a plurality of images of a document, each of the plurality of images having a respective relative polarization of the document;
identifying a feature of the document visible within each of the plurality of images, the feature having visual characteristics that differ based on a relative polarization at which the feature is viewed; and
outputting, in response comparing respective visual characteristics of the feature of the document in each of the plurality of images to corresponding expected visual characteristics of the feature of the document, an indication of verification of the document.

11. The method of claim 10, wherein
the visual characteristics of the feature are assigned to the document, and
the method further comprises:
receiving an indication of an identity of the document; and
determining the expected visual characteristics for the feature based on the indicated identity.

12. The method of claim 10 further comprising estimating, for each of the plurality of images, a respective relative polarization of the document within each of the plurality of images, wherein the comparing comprises comparing, for each of the plurality of images, the visual characteristics of the feature to the corresponding expected visual characteristics at the respective estimated relative polarizations of the document.

13. The method of claim 10, wherein the plurality of images comprises a video.

14. The method of claim 13, wherein the comparing comprises comparing an order of the visual characteristics of the feature in the video to an expected order based on a relative polarization rate of change of the document within the video.

15. The method of claim 10, wherein the document comprises a credit card.

16. The method of claim 10, wherein the document comprises a plurality of features, respective visual characteristics of each of the plurality of features being different based on a relative polarization at which the respective feature is viewed, and the method comprises:
identifying each of the plurality of features of the document within the plurality of images; and
outputting, in response to comparing the respective visual characteristics of each of the features to corresponding respective expected visual characteristics for the respective feature, the indication of verification of the document.

17. The method of claim 16, further comprising estimating, for each of the plurality of images, a respective relative polarization of the document within each of the plurality of images, wherein the comparing comprises comparing, for each of the plurality of images, the respective visual characteristics of each of the respective features to the corresponding expected visual characteristics at the respective estimated relative polarization.

18. A method of verifying a document containing a feature with visual characteristics that differ based on an orientation of a polarized filter, the method comprising:

observing the document through a polarized filter;

rotating at least one of the polarized filter and the document to rotate the orientation of the polarized filter with respect to the feature of the document;

comparing changes to visual characteristics of the feature to expected visual characteristics of the feature in view of a relative orientation of the polarized filter to the feature; and verifying the document based on the comparing.

19. The method of claim 18 further comprising capturing a plurality of images of the document through the polarized filter at respective relative orientations of the polarized filter, wherein the comparing comprises comparing changes to visual characteristics of the feature captured within the plurality of images to expected visual characteristics of the feature in view of the respective relative orientations of the polarized filter.

20. The method of claim 19 further comprising:

outputting for transmission, to a verification server, the plurality of images to a server for document; and receiving, from the verification server, an indication of a verification of the document.

* * * * *